United States Patent
Vermeulen et al.

(10) Patent No.: US 7,937,482 B1
(45) Date of Patent: May 3, 2011

(54) SCALABLE CONSENSUS PROTOCOL

(75) Inventors: Allan H. Vermeulen, Seattle, WA (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 360 days.

(21) Appl. No.: 12/056,597

(22) Filed: Mar. 27, 2008

(51) Int. Cl.
*G06F 15/16* (2006.01)

(52) U.S. Cl. ...................................................... 709/229

(58) Field of Classification Search .................. 370/254, 370/401, 390, 252; 709/229, 226; 707/100, 707/204, 202, 203; 714/11, 4, 10, 12
See application file for complete search history.

(56) References Cited

U.S. PATENT DOCUMENTS

| | | | | |
|---|---|---|---|---|
| 7,526,672 B2* | 4/2009 | Lin et al. | ............................. | 714/6 |
| 2005/0283644 A1* | 12/2005 | Lorch et al. | ......................... | 714/4 |
| 2008/0317061 A1* | 12/2008 | Dake | ............................. | 370/452 |
| 2009/0043988 A1* | 2/2009 | Archer et al. | .................... | 712/31 |

OTHER PUBLICATIONS

Hayashibara, et al., "Performance Comparison Between the Paxos and Chandra-Toueg Consensus Algorithms," 2002.
Leslie Lamport, Digital Equipment Corporation, The Part-Time Parliament, ACM Transactions on Computer Systems, vol. 16, No. 2, May 1998, pp. 133-169.
Mike Burrows, Google, Inc., The Chubby Lock Service for Loosely-Coupled Distributed Systems, 7th Symposium on Operating System Design, 2006.
Butler W. Lampson, Microsoft, "How to Build a Highly Available System Using Consensus," WDAG 96, 1996.
Wikipedia, "Two-Phase Commit Protocol," Mar. 5, 2008.

* cited by examiner

*Primary Examiner* — Man Phan
*Assistant Examiner* — Nourali Mansoury
(74) *Attorney, Agent, or Firm* — Robert C. Kowert; Meyertons, Hood, Kivlin, Kowert & Goetzel, P.C.

(57) ABSTRACT

In one embodiment, a system comprises a plurality of nodes coupled to a network. At least a subset of the nodes are configured to maintain a replica of a state machine. The nodes are classified into a plurality of non-overlapping classes. A first class comprises at least one node that is a current participant in a consensus protocol to control transitions of the state machine. A second class comprises nodes that are not current participants in the consensus protocol but which are reclassifiable into the first class. The node(s) in the first class are configured to act on a proposal for a transition of the state machine according to the consensus protocol.

32 Claims, 6 Drawing Sheets

SCALABLE CONSENSUS PROTOCOL

BACKGROUND

Replication is a popular technique adopted in distributed systems to improve system reliability (i.e., availability and durability). One technique for building replicated services is state machine replication, in which a deterministic service is replicated on multiple nodes. This replication in space ensures that the failure of a subset of the nodes on which the service is replicated does not render the service inaccessible.

When a state machine is replicated, the distributed system must ensure the consistency of the replicas with respect to state updates. One approach is to use a consensus protocol to ensure that replicas are mutually consistent. Consensus protocols include: 2-phase commit, Paxos, and the Chandra-Toueg algorithm.

Different consensus protocols have different scalability and availability properties. However, in all of the protocols, reaching a consensus becomes more difficult as the number of replicas increases. One reason for the difficulty is the increased likelihood, as the number of replicas increases, that a failure will affect one or more replicas at the time a consensus is being formed. The failure then prevents consensus decisions.

BRIEF DESCRIPTION OF THE DRAWINGS

The following detailed description makes reference to the accompanying drawings, which are now briefly described.

While the system and components thereof are susceptible to various modifications and alternative forms, specific embodiments thereof are shown by way of example in the drawings and will herein be described in detail. It should be understood, however, that the drawings and detailed description thereto are not intended to limit to the particular form disclosed, but on the contrary, all modifications, coverage of equivalents and alternatives falling within the spirit and scope of the appended claims is specifically intended.

DETAILED DESCRIPTION OF EMBODIMENTS

A distributed system may have a plurality of nodes, at least a subset of which maintain replicas of a state machine corresponding to an application being executed in the distributed system. The nodes are classified into one of a plurality of classes. Each node may only be included in one class at any given point in time. That is, the classes are non-overlapping. The nodes in a first class are the current participants in the consensus protocol implemented for the state machine, and these nodes determine which proposed state changes will be accepted and which will be denied according to the consensus protocol. Different state machines in the system may have different consensus protocols. Nodes in a second class are not current participants in the consensus protocol (and thus do not participate in forming consensus for proposed state changes). However, these nodes are capable of becoming participants in the consensus protocol (i.e. nodes in the second class may be reclassified into the first class, such as when a node in the first class is detected as failing or leaves the first class voluntarily). The set of nodes that maintain replicas of the state machine may be referred to as a "collective".

Accordingly, a relatively large number of replicas may be maintained in the collective, but a smaller number of nodes may actively participate in the consensus protocol. The larger number of replicas may enhance availability and reliability, and even performance, in some embodiments. On the other hand, the smaller number of nodes that participate in the consensus protocol (the "jurors") may reduce the latency to achieve consensus (which may improve performance), in one embodiment. Having a smaller number of jurors may also reduce contention in the consensus protocol. The ability to reclassify nodes from the second class to the first class may also enhance the availability of the consensus participants, in one embodiment. That is, if nodes in the first class fail or otherwise leave the collective, nodes in the second class may take their place and the consensus protocol may continue to function.

In the remainder of this description, the nodes in the first class (which participate in the consensus protocol for proposed state machine transitions) will be referred to as jurors. Nodes in the second class (not participating in the consensus protocol, but available to become jurors) will be referred to as citizens.

In some embodiments, a third class may be defined. Nodes in the third class will be referred to as serfs. Serfs may maintain a replica of the state machine, and thus may be informed of transitions in the state machine. However, serfs may not be permitted to become jurors (and may not be required to become jurors). Serfs may be supported, e.g., so that nodes that do not implement the consensus protocol may still participate in the state machine replication. Other embodiments need not include the serf class.

In one embodiment, a node may be classified as a master node. The master node may also be a juror, but is not required to be. The master may have additional responsibilities for the collective. For example, the master may periodically transmit "heartbeat" messages, which may assure the nodes that the collective is still active. The heartbeat messages may also carry data that identifies the current state of the state machine or machines for which the collective is maintaining replicas. For example, in one embodiment, each state that has been transitioned to in the state machine may be assigned a sequence number, which may increase monotonically as state transitions are accepted. The master node may transmit the current sequence numbers maintained by the master node, thus indicating the master node's view of the most recent state of each state machine. While the master may not have the most recent state, a node receiving the heartbeat message may be informed that its state is not the most recent based on the master's sequence numbers. Other embodiments may not implement the master node.

Various embodiments may implement any desired consensus protocol. Generally, a consensus protocol defines the mechanism by which nodes can determine whether or not a proposed transition is to be accepted, as well as the mechanism for resolving conflicts between conflicting proposed transitions. For example, the 2-phase consensus protocol may include a first phase in which all nodes involved in the consensus protocol agree to a proposed transition (or, if any node disagrees, the proposed transition is denied). In the second phase, the nodes actually perform the transition if the transition has been accepted. The Paxos consensus protocol is another example, in which a majority of the nodes agreeing to the transition permits the transition to occur. Yet another example may be the Chandra-Toueg algorithm. Other embodiments may implement any other consensus protocol.

Using the consensus protocol to determine each state transition, and communicating the accepted state transitions to each node, may permit the coordination of the state machine replicas on each node. That is, each state machine replica will pass through the same state transitions in the same order. The transitions may not occur at the same time, however, in some embodiments. By controlling the state machines in this fashion, each node may experience the same overall behavior in the corresponding application (again, not necessarily at the same time). Some minor variations in behavior may occur due to the timing of state machine updates. Additionally, in some cases, the state machine may not be completely dispositive of the applications behavior, and thus some behavioral variation may occur even when the same states are traversed in the same order.

In some embodiments, a juror may maintain a replica of a state machine. In other embodiments, the juror may not maintain a replica. In such embodiments, the juror may participate in the consensus protocol and may maintain a record of the accepted transitions (e.g. a transition log as described in more detail below).

Figure 1:
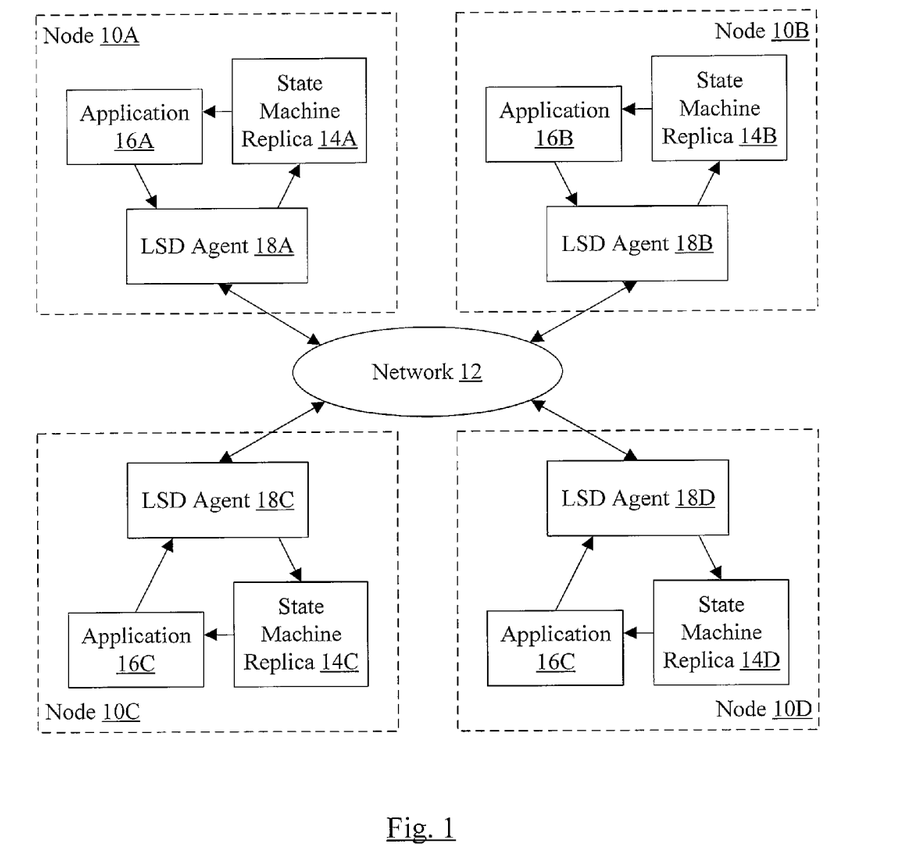
FIG. 1 is a block diagram of one embodiment of a system.

Turning now to FIG. 1, a block diagram of one embodiment of a system is shown. The system includes a plurality of nodes 10A-10D coupled to a network 12. The number of nodes may vary from embodiment to embodiment. The nodes 10A-10D each maintain a state machine replica (14A-14D, respectively) that correspond to instances of an application that is executing (applications 16A-16D, respectively). Additionally, each node 10A-10D includes a lightweight synchronization daemon (LSD) agent 18A-18D.

The applications 16A-16D may execute in their respective nodes 10A-10D, based at least in part on the state of the replica 14A-14D. During execution, a given application 16A-16D may determine that a state transition (or more briefly "transition") should occur in the state machine. The given application may request that the state transition be performed, communicating the request to the LSD agent 18A-18D in the given application's node. The transition request is referred to as a transition proposal.

The LSD agents 18A-18D may coordinate to implement the consensus protocol, based in part on the classification of the node 10A-10D on which the LSD agent 18A-18D operates. The LSD agent 18A-18D that receives a proposal from the corresponding application may transmit the proposal to the nodes 10A-10D that are jurors. The jurors may apply the consensus protocol to the proposal, and may determine if the transition is accepted or denied. Accepted transitions are transmitted to each node that maintains a state machine replica (whether those nodes are jurors, citizens, or serfs). Jurors may be aware of the accepted transitions by virtue of participating in the consensus protocol. Other nodes may be informed of the accepted transitions, directly or indirectly from the jurors. In one embodiment, each serf or citizen node is assigned to a juror, and each juror may transmit the accepted transitions to its assigned serfs or citizens. Other embodiments may broadcast the accepted transitions, write accepted transitions to a shared data structure to which the nodes have access, propagate the accepted transitions via gossiping, implement polling to propagate the accepted transitions, etc.

The LSD agents 18A-18D may apply the accepted transitions to the replicas 14A-14D. Additionally, for denied transitions, the LSD agent 18A-18D in the node 10A-10D that generated the proposal may, in some embodiments, inform the application in the node that the proposal was denied. In other embodiments, the acceptance of a different transition from the same current state as the transition proposed by the application may inform the application of the denial.

The nodes 10A-10D generally comprise hardware computing resources for executing the applications 16A-16D and the agents 18A-18D. For example, a given node may be a computer system. Alternatively, two or more nodes may be allocated processors in the same multiprocessor system. Two or more nodes may be scheduled for execution on the same processor. The nodes may also include software resources.

The network 12 may comprise any type of network. For example, the network 12 may include a local area network (LAN), a metropolitan area network (MAN), a wide area network (WAN), the Internet, wireless networks, and/or any combination of the preceding networks and any other type of network. Accordingly, a node may be coupled to the network in any fashion, direct or indirect, including wireless connection.

The applications 16A-16D may comprise any programs, or portions thereof, that may execute on a computer system as one or more processes. The programs may comprise executable instructions expressed in any desired format (e.g. binary instructions that are executable by the processors in the hardware computing resources used to form the system; instructions defined in interpreted languages such as scripting languages, Java bytecodes, etc.)

The state machines corresponding to the replicas 14A-14D may have any form and definition, and the LSD agents 18A-18D do not necessarily understand the meaning of the states or the transitions of the state machines in order to perform their consensus protocol operations and state management operations. That is, the LSD agents 18A-18D may operate for any state machine or state machines.

The LSD agents 18A-18D may also comprise executable instructions, along with one or more data structures maintained by the executable instructions expressed in any desired format.

It is noted that, while one application/state machine replica is illustrated in each node 10A-10D, a given node may include more than one state machine replica and more than one application that relies on the state machine. Furthermore, the node may operate in different roles for different state machines (e.g. the node may be a serf for one state machine, a citizen for another state machine, and a juror for yet another state machine).

Figure 2:
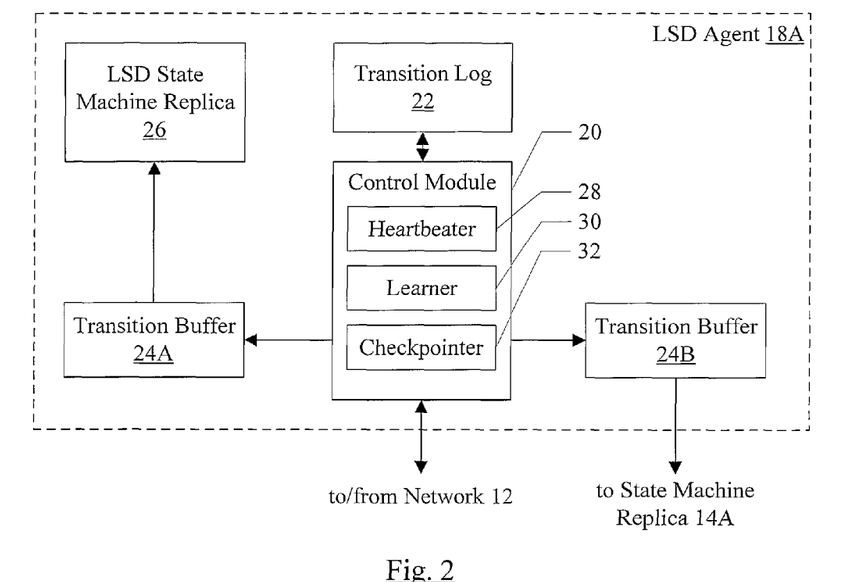
FIG. 2 is a block diagram of one embodiment of a lightweight synchronization daemon (LSD) agent illustrated in FIG. 1.

Turning now to FIG. 2, a block diagram illustrating one embodiment of the LSD agent 18A in greater detail is shown. In the illustrated embodiment, the LSD agent 18A includes a control module 20, a transition log 22, transition buffers 24A-24B, and an LSD state machine replica 26. The control module 20 may comprise a heartbeater 28, a learner 30, and a checkpointer 32.

The LSD state machine may be similar to the application state machine, in that each node may include a replica such as the replica 26 and the nodes may be jurors, citizens, or serfs for the LSD state machine. The LSD state machine may comprise a "system" state machine that includes global information about the state of the system as a whole, along with certain information about the state machines in the system. Additional details will be provided below.

The control module 20 is configured to transmit and receive messages on the network 12. The connection between the control module 20 (which may comprise executable instructions) and the network 12 may depend on the details of the particular network and the fashion in which the nodes 10A-10D couple to the network 12. The messages may include transition proposals for the juror nodes, responses to the proposals, messages exchanged between jurors to apply the consensus protocol to a proposal, etc.

When the control module 20 receives an accepted transition, the control module 20 may write the transition to the transition log 22. The transition log 22 may thus comprise a list of the accepted transitions for each state machine on the node (e.g. the replicas 26 and 14A). In one embodiment, each entry in the transition log 22 may identify the state machine to which the transition applies, the transition itself, a sequence number assigned to the transition, a timestamp, and any other desired data (e.g. parameters for the transition, a sequence number in the LSD state machine that stores context such as the configuration of the collective at the time the transition is accepted, the node that proposed the transition, etc.). In one embodiment, checkpoints of the replicas 26 and 14A may be made periodically (e.g. by the checkpointer 32), and transitions that occurred before the checkpoint may be discarded.

The control module 20 may also write accepted transitions to the transition buffer 24A-24B that corresponds to the state machine replica to which the transition applies. The transition buffers 24A-24B may be provided to buffer transitions that may be received out of order with respect to earlier transitions. As mentioned previously, transitions are applied to each replica in the same order as each other replica. For example, each transition may be assigned a sequence number, and the sequence numbers of accepted transitions to a given state machine may be monotonically increasing at a constant rate (e.g. the sequence numbers may be integers, and each integer may be used in the sequence and may be used to determine the order of the corresponding transition with respect to other transitions of the state machine). Accordingly, if there is a hole between the most recently applied transition to the replica and the accepted transition, then the accepted transition may wait in the transition buffer 24A-24B until the previous transitions have been received and applied. In one embodiment, the learner 30 may be used to obtain missing transitions when holes are detected in the sequence of transitions.

The control module 20 may also implement the operation of serf, citizen, and/or juror in the consensus protocol. The heartbeater 28 may transmit heartbeat messages, as described in further detail below.

Figure 3:
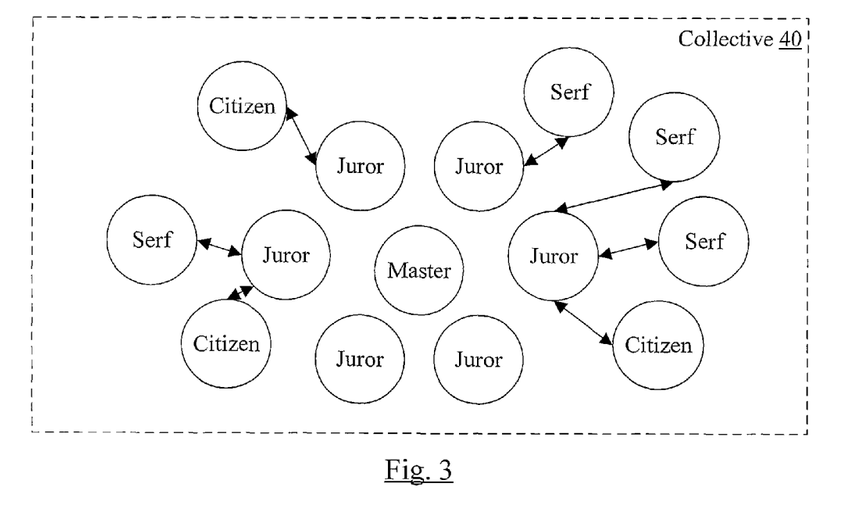
FIG. 3 is a block diagram of one embodiment of a collective.

Turning next to FIG. 3, a block diagram of one embodiment of a collective 40 is shown. The collective 40 comprises multiple nodes, represented as circles in FIG. 3. The labels in the circles identify the nodes as master, juror, citizen, and serf nodes. Also shown in FIG. 3 is the assignment of citizens and serfs to a given juror, illustrated by the arrows between each citizen or serf and a juror. The illustrated assignments are merely exemplary, and any assignment may be made in other embodiments. The jurors and master may be communicate to establish the consensus.

Generally, the collective may be any set of nodes that cooperate to manage the state transitions of a state machine so that each node sees the same state machines, moving through the same sequence of transitions in the same order, though not necessarily at the same time. A collective may have any number of nodes. For example, between five and a few hundred nodes may be expected, in one embodiment, although other embodiments may have more or fewer nodes.

The set of nodes in a collective and their roles (serf, citizen, juror, and master) at a given point in time may be referred to as a configuration. The roles may change over time, and nodes can enter and leave the collective (voluntarily, through error, or by force), so a collective have multiple configurations over its lifetime. Each configuration may be assigned an index, starting at zero, and may be recorded by the LSD state machine.

While the embodiment of FIG. 3 illustrates a collective in which citizens and serfs are assigned to jurors, other embodiments may organize the collective in other fashions. In some embodiments, there may be no assignment of nodes (serf, citizen, or juror) to other nodes. For example, an embodiment may use gossiping to communicate accepted state transitions. With gossiping, a node may randomly select another node with which to communicate and may exchange data indicating the accepted transitions (e.g. current sequence numbers may be exchanged for each replicated state machine). If the exchanged data indicates that a node is missing one or more state transitions, that node may request the missing state transitions from the other node. Over time, the random gossiping between nodes may propagate accepted state transitions across the collective. In another embodiment, nodes may poll for accepted state changes (e.g. citizens and serfs may poll jurors). Such an embodiment may be used, e.g., if state transitions are occurring frequently. The juror that is polled by a given citizen or serf may change dynamically (e.g. the citizen or serf may randomly select a juror to poll, the citizen or serf may poll jurors in a defined sequence, etc.).

Figure 4:
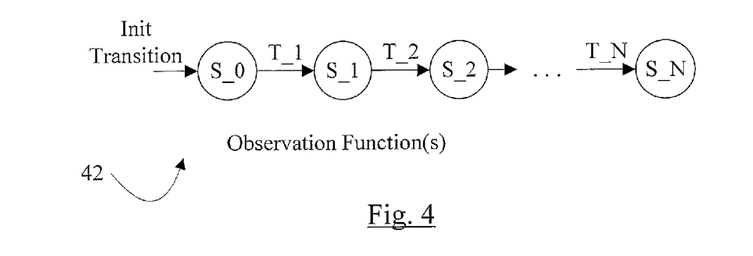
FIG. 4 is a block diagram of one embodiment of a generic state machine.

Turning now to FIG. 4, a block diagram is shown illustrating one embodiment of a generic state machine 42 that may be managed as a set of replicas using the LSD agents 18A-18D. The state machine 42 may represent the LSD state machine, or any state machine that may be used by an application and may be replicated on two or more nodes.

The state machine includes a set of states (illustrated as S_0 to S_N in FIG. 4), a set of transition functions, and optionally one or more observation functions. Each state is entered via a state transition, and each state is exited via a state transition.

The transitions are illustrated by arrows in FIG. 4, denoted T_0 to T_N, wherein the digit after the underscore is the same as the state that the transition enters in the state machine. The first transition, labeled "Init Transition" in FIG. 4 but also referred to as T_0, does not have a source state. The Init Transition may be explicitly specified by the node that creates the state machine (referred to as a founder of the state machine).

The transitions may be implemented as functions that map the current state (and optionally one or more input parameters) to the next state. Transition functions map to a specific next state, and thus applying the transition function moves the state machine to the next state.

Figure 5:
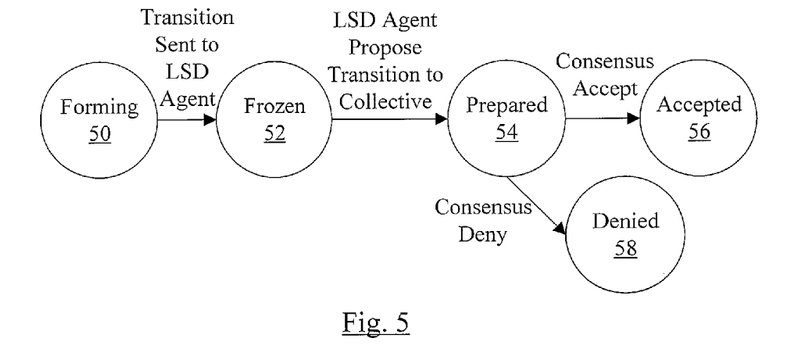
FIG. 5 is a block diagram of one embodiment of the phases of a state transition.

Turning now to FIG. 5, a block diagram of one embodiment of the phases of a state transition is shown. The phases may include operation from the application and the LSD agents, as highlighted below.

The application may formulate a proposed state transition, based on the current state in the corresponding replica in the node and the operation of the application. In the forming phase 50, the application may be establishing the transition to propose, but may not have completed the proposal yet. Once the proposal is complete, the application may transmit the proposal to the LSD agent in the application's node, and the state transition may move to the frozen phase 52.

Figure 6:
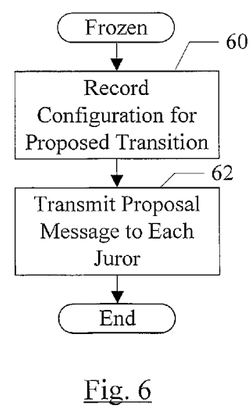
FIG. 6 is a flow chart illustrating operation of one embodiment of the LSD agent in the frozen phase of the state transition.

In the frozen phase 52, the proposed state transition is formed, but only the node in which the proposal was generated has the proposal. The LSD agent in the node may process the proposal and transmit the proposal to the jurors. For example, FIG. 6 is a flowchart that illustrates operation of one embodiment of the LSD agent (and more particularly the control module 20 in the embodiment of FIG. 2) for a proposed state transition in the frozen phase 52. The LSD agent/control module 20 may include instructions which, when executed on a node, implement the operation illustrated in FIG. 6. While the blocks are shown in a particular order for ease of understanding, other orders may be used.

The control module 20 may record the proposed state transition and may also record the current configuration of the collective 40 at the time the proposal is transmitted (block 60). The proposal and configuration may be recorded in any fashion (e.g. a local buffer used by the LSD/agent control module 20 for temporary storage, as part of the local state associated with the LSD state machine replica 26, etc.). In one embodiment, the LSD state machine replica 26 maintains a list of configurations, including the current configuration and any previous configurations that may still be referenced in the system. Each configuration may have a configuration sequence number assigned to it. The control module 20 may record the configuration sequence number of the current configuration with the proposal. Additionally, the control module 20 may assign a sequence number to the proposal. The assigned sequence number may be one greater than the most recent sequence number seen by the node for the corresponding state machine replica. That is, the assigned sequence number may be one greater than the sequence number of the current state of the state machine in the node. If the local replica has not been updated to the most recent state, then the sequence number assigned to the proposal will be in use for an accepted transition and the collective may deny the proposal because it is based on outdated state.

The control module 20 may transmit the proposal to the collective 40 on the network 12 (block 62). The proposal may be transmitted at least to the jurors in the collective. The particular form of the transmission may vary, depending on the underlying network. For example, the proposal may be broadcast to all nodes, and those nodes that are not jurors may discard the proposal. Alternatively, the transmissions may be specifically addressed to each juror, and only the jurors may receive the proposals, although the proposal may be routed through other nodes that merely relay the message according to the network protocol.

Returning to FIG. 5, when the proposal has been transmitted to the collective, the proposed state transition enters the prepared phase 54. In the prepared phase 54, the proposal has been transmitted and thus is in the process of having the consensus protocol applied to it by the jurors. The citizens and serfs are not involved in the generation of the consensus.

Figures 7, 8:
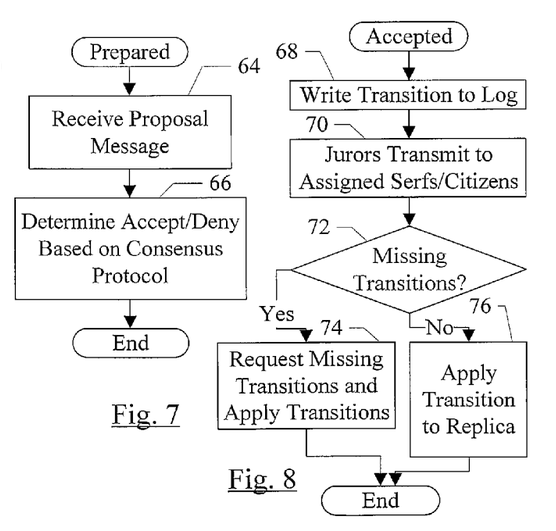
FIG. 7 is a flowchart illustrating operation of one embodiment of the LSD agent in the prepared phase of the state transition.
FIG. 8 is a flowchart illustrating operation of one embodiment of the LSD agent in the accepted phase of the state transition.

FIG. 7 is a flowchart that illustrates operation of one embodiment of the LSD agent (and more particularly the control module 20 in the embodiment of FIG. 2) for a proposed state transition in the prepared phase 54, in a node that is a juror in the current configuration. Non juror nodes may not receive the proposal, or there may be a decision block before the flowchart of FIG. 7 in which the LSD agent/control module 20 verifies that the node is a juror. The LSD agent/control module 20 may include instructions which, when executed on a node, implement the operation illustrated in FIG. 7. While the blocks are shown in a particular order for ease of understanding, other orders may be used.

The control module 20 in the juror node may receive the proposal message (block 64) and may participate in the consensus protocol with the other jurors to determine if the proposal is accepted or denied (block 66). The details of the consensus protocol vary from protocol to protocol, and any consensus protocol may be used in various embodiments. Reasons for denying a proposal may include detecting that the sequence number assigned to the proposal is less than or equal to the current sequence number for the state machine for which the transition is proposed (indicating that the proposal was generated from a stale state, because a different transition has been previously accepted). Other reasons for denying a proposal may include conflicting proposals which resolve in another proposal's favor, consensus is not possible (e.g., if the proposer cannot reach a majority of the juror nodes due to network partition), etc.

Once the consensus protocol decision is agreed to by the jurors, the proposal moves to either the accepted phase 56 or the denied phase 58. If the proposal is denied, the node that generated the proposal may be informed of the denial so that the recorded proposal may be deleted. Alternatively, a different proposal may be accepted with the same sequence number. When the proposing node is informed of the accepted proposal, it may detect that the same sequence number corresponds to its own proposal and may infer that its proposal was denied. Denied proposals are not applied to any of the state machine replicas.

If the proposal is accepted, each juror may apply the transition to their state machine replica and may also transmit the accepted transition to the serfs and/or citizens assigned to that juror. FIG. 8 is a flowchart that illustrates operation of one embodiment of the LSD agent (and more particularly the control module 20 in the embodiment of FIG. 2) for an accepted state transition (e.g. in the accepted phase 56). The LSD agent/control module 20 may include instructions which, when executed on a node, implement the operation illustrated in FIG. 8. While the blocks are shown in a particular order for ease of understanding, other orders may be used.

The control module 20 may write the transition to its transition log 22, and may also write the transition to the transition buffer 24A-24B corresponding to the state machine to which the transition is to be applied (block 68). If the node is a juror for the state transition, the control module 20 may also transmit the accepted transition to each serf and citizen that is assigned to the juror (block 70). The control module 20 in each serf and citizen may perform the operation illustrated in FIG. 8 as well, except for transmitting the accepted transition to other nodes, in one embodiment.

The control module 20 may scan the transition buffer 24A-24B and the state machine replica 26 or 14A-14D to determine if there are any missing transitions (between the most recently applied transition in the replica and the accepted transition). If there are missing transitions, the control module 20 may request the missing transitions from another node (decision block 72, "yes" leg and block 74). The control module 20 may wait for the missing transitions to be supplied and apply the missing transitions and the newly accepted transition. Alternatively, the control module 20 may cease processing the transitions temporarily, and may attempt to apply the missing transitions and the accepted transitions at the time another accepted transition is supplied. The control module 20 may transmit the request to a juror, multiple jurors, or even broadcast the request to the collective. If there are no missing transitions (decision block 72, "no" leg), the control module 20 may apply the accepted transition to the replica and delete the transition from the transition buffer 24A-24B (block 76).

Figures 9, 10, 11, 12:
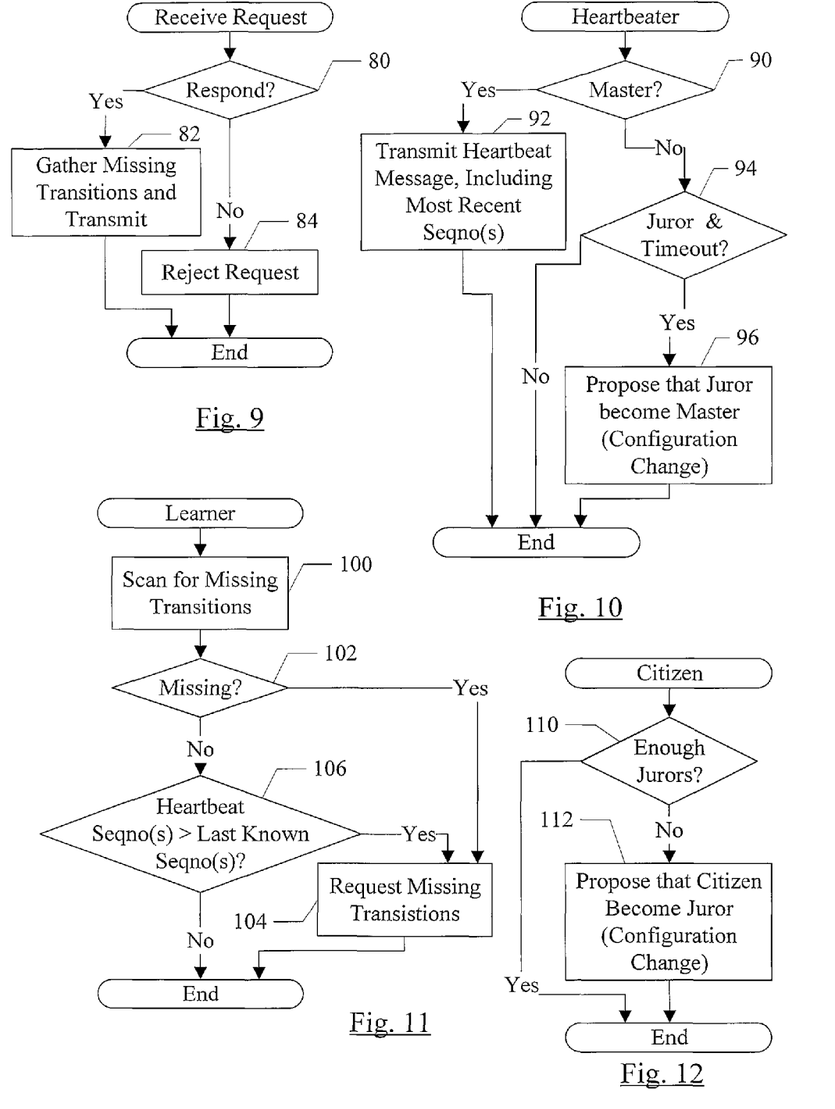
FIG. 9 is a flowchart illustrating operation of one embodiment of the LSD agent in response to receiving a request for state update.
FIG. 10 is a flowchart illustrating operation of one embodiment of the heartbeater illustrated in the LSD agent of FIG. 2.
FIG. 11 is a flowchart illustrating operation of one embodiment of the learner illustrated in the LSD agent of FIG. 2.
FIG. 12 is a flowchart illustrating operation of one embodiment of an LSD agent in a citizen of the collective.

Turning now to FIG. 9, a flowchart is shown that illustrates operation of one embodiment of the LSD agent (and more particularly the control module 20 in the embodiment of FIG. 2) in response to receiving a request for state transitions for a state machine (e.g. such as the request transmitted at block 74 in FIG. 8). The LSD agent/control module 20 may include instructions which, when executed on a node, implement the operation illustrated in FIG. 9. While the blocks are shown in a particular order for ease of understanding, other orders may be used.

The control module 20 may determine if it will respond to the request (decision block 80). A variety of factors may affect the determination, in various embodiments. For example, if the node does not have all of the requested state transitions, the control module 20 may not respond. The node may not be configured to respond to the request, or may only respond if it is currently a juror. If the control module 20 determines that it will respond to the request (decision block 80, "yes" leg), the control module 20 may gather the transitions identified in the request and may transmit them to the requesting node (block 82). If not (decision block 80, "no" leg), the control module 20 may reject the request (block 84). In one embodiment, the control module 20 may return a message to the request node indicating the rejection.

FIG. 10 is a flowchart that illustrates operation of one embodiment of the LSD agent (and more particularly the heartbeater 28 in the embodiment of FIG. 2). The flowchart of FIG. 10 may be performed periodically, e.g. at the expiration of a fixed or programmable period of time, at the expiration of a fixed or programmable period of time in which no communications have been transmitted in the collective, etc. The LSD agent/heartbeater 28 may include instructions which, when executed on a node, implement the operation illustrated in FIG. 10. While the blocks are shown in a particular order for ease of understanding, other orders may be used.

If the heartbeater 28 is executing on the master node (decision block 90, "yes" leg), the heartbeater 28 may transmit a heartbeat message (block 92). The heartbeat message may inform other members of the collective that the collective is still live. In one embodiment, the heartbeat message may include data that identifies the most recent state of one or more state machines that are replicated in the collective. The data may be anything that may identify the state. For example, in embodiments that implement the sequence numbers for the state transitions, the master node may transmit the most recent sequence number for each state machine, as currently known to the master.

If the heartbeater is not executing on the master node (decision block 90, "no" leg), the heartbeater 28 may determine if it is executing on a juror and a timeout has occurred without receiving a heartbeat from the master node (decision block 94). The timeout may be a fixed or programmable time, or may be a fixed or programmable time since the most recent communication in the collective. In one embodiment, the timeout may be significantly larger than the time between heartbeats (e.g. 2-3 times larger, or more). If the heartbeater 28 is executing on a juror and the timeout has occurred (decision block 94, "yes" leg), the heartbeater 28 may propose that the node be made a master (block 96). The proposal may be a configuration change, and may occur as a state change on the LSD state machine. The proposal may be accepted or denied using the consensus protocol, as previously discussed.

While the embodiment illustrated in FIG. 10 uses heartbeats to detect failure, other embodiments may use any method for failure detection. For example, another embodiment may use a distributed gossiping protocol in which nodes periodically gossip with one another to detect a loss of contact with a node or nodes.

FIG. 11 is a flowchart that illustrates operation of one embodiment of the LSD agent (and more particularly the learner 30 in the embodiment of FIG. 2). The flowchart of FIG. 11 may be performed periodically, e.g. at the expiration of a fixed or programmable period of time, in response to receiving a heartbeat message including data indicating the most recent state, etc. The LSD agent/learner 30 may include instructions which, when executed on a node, implement the operation illustrated in FIG. 11. While the blocks are shown in a particular order for ease of understanding, other orders may be used.

The learner 30 may be used to capture state transitions that have been missed by the node (either due to the failure to receive accepted state transitions from the network, failure of the node itself, recent joining of the node into the collective, etc.). The learner 30 may scan the transition buffers 24A-24B to determine if any missing state transitions are preventing the buffered transitions from being applied (block 100). If any missing transitions are detected (decision block 102, "yes" leg), the learner 30 may generate a request for the missing transitions (block 104). Additionally, the learner 30 may receive the sequence numbers from the most recent heartbeat message. If any of the received sequence numbers are greater than the last known sequence numbers in the node (decision block 106, "yes" leg), the learner 30 may generate a request for the missing transitions (block 104).

The checkpointer 32 may generate checkpoints for the state machines. In one embodiment, there may be two types of checkpoints: local checkpoints and global checkpoints. The local checkpoints may be generated by the LSD agent, and may be used to restore the local state machine replica to near the present state without having to request all of the state transitions from other nodes. For example, the if the node crashes and is restarted, the local checkpoints may be used. The local checkpoints may be written to a non-volatile storage local to the node, such as a local disk. Global checkpoints may be made as a state transition in the LSD state machine. Thus, the global checkpoint may be accepted according to the consensus protocol. Once a global checkpoint is accepted, in one embodiment, nodes may delete state transitions from their transition logs 22 that occurred before the checkpoint. Checkpoints may also use one or more levels of indirection. The checkpoint may, e.g., be a pointer to a location at which the checkpoint is stored (e.g. a universal resources locator, or URL). Other embodiments may implement checkpoints in other fashions, and there need not be both local checkpoints and global checkpoints in other embodiments. For example, the master node may generate snapshots and may store the snapshots in a separate storage service or any desired storage device. Generating the snapshots may be another other master node's additional responsibilities, for example.

Local and global checkpoints may have an associated sequence number, that is the last state transition represented in the checkpoint. The checkpoint may thus be an efficient encoding of the sequence of transitions state S_0 through state S_(sequence number). Applying a checkpoint to a state machine is equivalent to initializing the state machine with the init transition and then applying the transitions up to the sequence number where the checkpoint was created.

Turning now to FIG. 12, a flowchart is shown that illustrates operation of one embodiment of the LSD agent (and more particularly the control module 20 in the embodiment of FIG. 2) in a node that is a citizen in the current configuration. The flowchart of FIG. 12 may be performed periodically, e.g. at the expiration of a fixed or programmable period of time, etc. The LSD agent/control module 20 may include instructions which, when executed on a node, implement the operation illustrated in FIG. 12. While the blocks are shown in a particular order for ease of understanding, other orders may be used.

The control module 20 may check the current configuration in the LSD state machine replica 26 to determine if the number of jurors in the configuration is at least equal to a desired number of jurors (decision block 110). The desired number of jurors may be programmable, and may be part of the LSD state machine's state, for example. The desired number of jurors may be measured as a function of the size of the collective 40 (e.g. a percentage of the number of nodes in the collective), as a specified number independent of the size of the collective, etc. If the number is jurors is less than the desired number of jurors (decision block 110, "no" leg), the control module 20 may propose that the node be changed from citizen to juror (block 112). The change is a configuration, in one embodiment, and thus may be made as a proposed state transition of the LSD state machine.

Nodes in other classes may detect that the configuration does not include the desired number of jurors. For example, a current juror may detect it, and may propose a node to become a juror. The juror may select any citizen, in any fashion, to propose as a juror. Similarly, any node that detects that the configuration does not include the desired number of jurors may propose that any citizen be made a juror.

Figure 13:
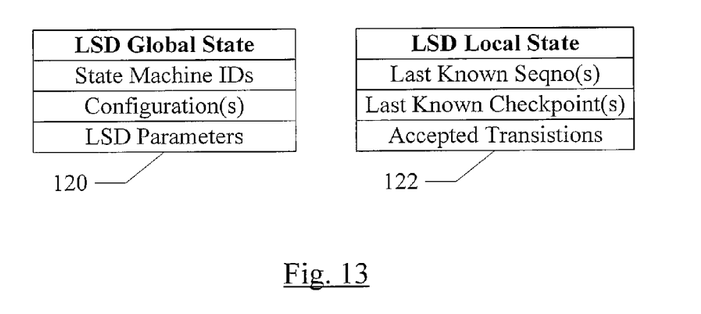
FIG. 13 is a set of tables illustrating exemplary LSD state for one embodiment.

FIG. 13 is a set of tables listing one embodiment of the state that may be part of the LSD state machine. Other embodiments may include additional state, subsets or supersets of the listed states and/or additional state, etc. The LSD state machine may include global state, changes to which may be coordinated using the consensus protocol. The LSD state machine may also include local state that may be changed (e.g. by the LSD agent) locally without consulting other nodes in the collective.

The LSD global state is listed in the table 120 for this embodiment. The global state may include a list of state machine identifiers identifying the state machines that are being maintained by the nodes in the collective. The global state may further include one or more configurations, including the current configuration and one or more previous configurations that may still be referred to by proposed state transitions or accepted transitions that have not be superceded by a global checkpoint. The global state may also include one or more LSD parameters. For example, the parameters may include the timeouts described above for the heartbeater 28 and the desired number of jurors.

The LSD local state is listed in the table 122 for this embodiment, and may include the last known sequence number (the sequence number of the most recent accepted state transition) for each state machine in the node, including the LSD state machine and any application state machines that are replicated. The local state may also include the last known checkpoint for each state machine. Juror nodes may also include a list of accepted transitions.

Figure 14:
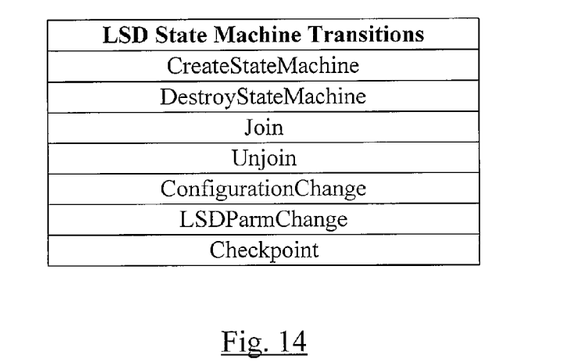
FIG. 14 is a table listing exemplary LSD state machine transitions for one embodiment.

FIG. 14 is a table listing one embodiment of the state transitions that may be supported by the LSD state machine. Other embodiments may include additional transitions, subsets or supersets of the listed transitions and/or additional transitions, etc. Each transition may be proposed to the collective by one of the nodes, and may be accepted or denied by the jurors, as described previously.

A CreateStateMachine transition may be supported to permit a node in the collective to create a state machine that may be replicated in the collective (e.g. an application state machine). The CreateStateMachine transition may include the Init Transition as a parameter, as well as an identifier for the state machine being created. Similarly, a DestroyStateMachine transition may be used to remove a state machine from replication in the collective, and may include an identifier of the state machine being destroyed as a parameter.

The Join transition may be used to add a node to the collective. The transition may include an identifier of the node being joined, as well as in indication of the class for the node (e.g. serf or citizen) and the juror to which the node is assigned. Similarly, a node may be removed from the collective using an Unjoin transition, which may have a node identifier as a parameter.

Both the Join and Unjoin transitions cause a configuration change by adding or deleting a node. Nodes within the collective can have their classification changed using a ConfigurationChange transition. As described previously, for example, a citizen may propose a configuration change to change to a juror, and a juror may propose a configuration change to change to a master. Other configuration changes may include demoting jurors to citizens, demoting citizens to serfs, etc. The ConfigurationChange transition may include an identifier of the node whose classification is being changed, and the new classification.

Global LSD parameters (in the Global LSD state table 120 in FIG. 13) may be changed using the LSDParmChange transition. Parameters of this transition may include an identifier of the parameter to be change, and the new value for the parameter. The Checkpoint transition may be used to log a global checkpoint, as described previously.

Figure 15:
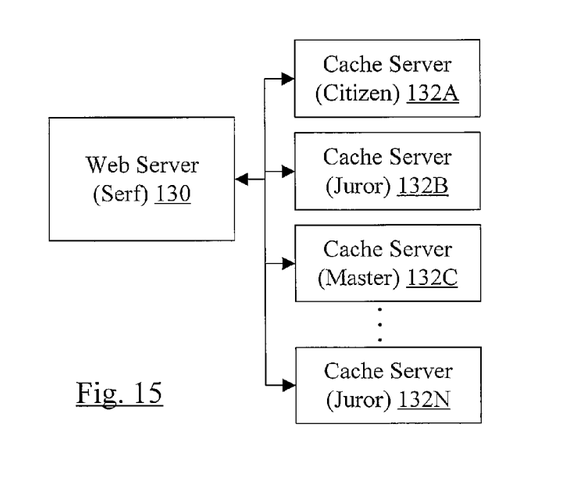
FIG. 15 is a block diagram of one embodiment of a web server and cache servers illustrating an example of the scalable consensus protocol.

Turning now to FIG. 15, a block diagram of one embodiment of a web server 130 and cache servers 132A, 132B, 132C, . . . 132N is shown. The web server 130 may be configured to receive requests from web browsers for content, and may be configured to serve that content to the browsers. The cache servers 132A-132N may be configured to cache content, based on certain TCP/IP address ranges, for example. That is, the address ranges that are served by the web server 130 may be spread over the cache servers 132A-132N.

The state machine that is maintained by the collective comprising the web server 130 and the cache servers 132A-132N may control the cache ranges that are assigned to the cache servers 132A-132N. For example, if cache servers are deleted or added to the collective, the ranges served by each cache server may be changed. Additionally, depending on the access patterns for the content, the cache ranges may be changed to balance the load among the cache servers.

Cache servers 132A-132N may thus be citizens, jurors, or the master in the collective. The web server 130 may be a serf. That is, the web server 130 may need to be aware of the cache range changes that are implemented as state transitions by the cache servers 132A-132N (so that the web server 130 may transmit a request to a cache server that is caching a range including the requested content), but may not need to participate in the state changes.

Figure 16:
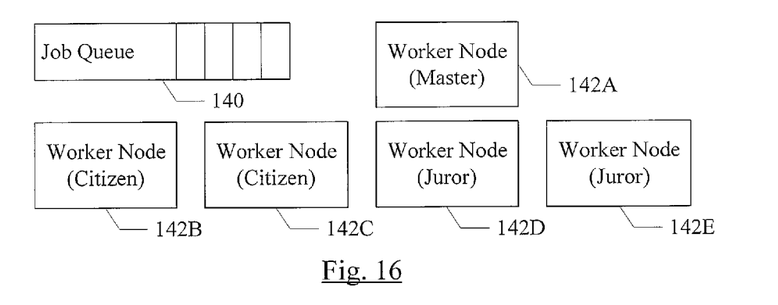
FIG. 16 is a block diagram of a job queue and a set of worker nodes illustrating another example of the scalable consensus protocol.

FIG. 16 is another example in which state machine replication may be used. In this example, there may be a job queue 140 that stores computing jobs to be performed by the worker nodes 142A-142E. The replicated state machine in this example may be the job queue 140. The worker nodes 142A-142E may claim jobs from the job queue 140 as state transitions in the state machine, assuring that the same job is not claimed by more than one node. The worker nodes 142A-142E may be citizens, jurors, or the master (e.g. as shown in FIG. 16). There may also be job generators (not shown in FIG. 16) that write jobs into the job queue 140. The job generators may also be nodes in the collective, and writing jobs to the queue may be state transitions in the state machine as well.

Computer Accessible Medium and System

Figure 17:
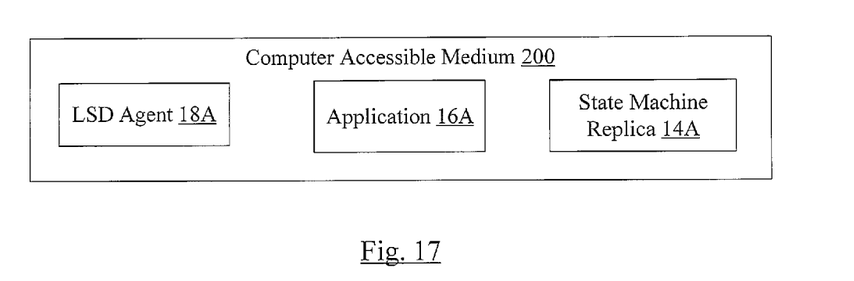
FIG. 17 is a block diagram of one embodiment of a computer accessible medium.

Turning now to FIG. 17, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., microelectromechanical systems (MEMS), etc. The storage media may be insertable into the computer, integrated into the computer (e.g. a fixed disk or RAM), or coupled to the computer via a communication medium such as a network and/or a wireless link. The computer accessible medium 200 in FIG. 17 may store one or more of the LSD agent 18A (including any of its components as illustrated in FIG. 2, for example), the application 16A, and the state machine replica 14A (and/or any of the like components from any of the other nodes in FIG. 1). Generally, the computer accessible medium 200 may store any set of instructions which, when executed, implement a portion or all of the flowcharts shown in one or more of FIGS. 6-12. A carrier medium may include computer accessible storage media as well as transmission media such as wired or wireless transmission.

Figure 18:
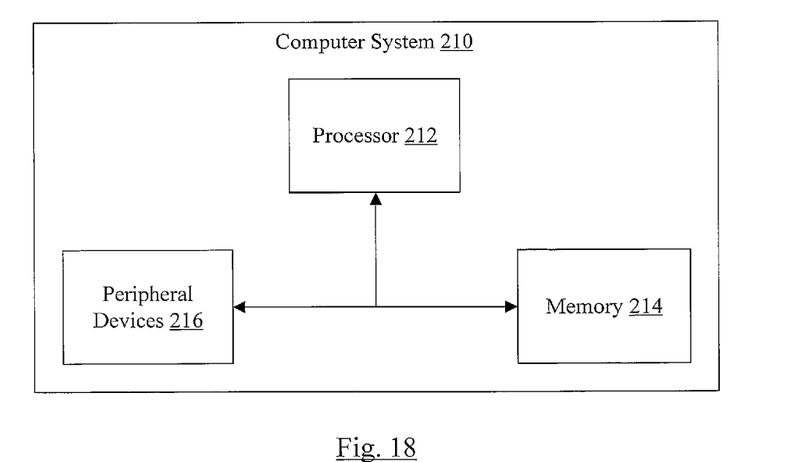
FIG. 18 is a block diagram of one embodiment of a computer system.

FIG. 18 is a block diagram of one embodiment of an exemplary computer system 210. For example, any of the nodes 10A-10N may be implemented on such a computer system. In the embodiment of FIG. 18, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to couple the processor 212, the memory 214, and the peripheral devices 216, creating multiple connections between these components.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use (including the data structures described herein), etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.). The networking hardware may be used to couple to the network 12, for example.

Numerous variations and modifications will become apparent to those skilled in the art once the above disclosure is fully appreciated. It is intended that the following claims be interpreted to embrace all such variations and modifications.

What is claimed is:

1. A system, comprising:
a plurality of nodes coupled to a network, wherein at least a subset of the plurality of nodes are each configured to maintain a replica of a state machine; and
the plurality of nodes are classified into a plurality of non-overlapping classes, and a first class of the plurality of non-overlapping classes comprises multiple nodes that are each a current participant in a consensus protocol for controlling transitions of the state machine such that respective state machine replicas maintained by at least one node in the first class and one or more nodes in a second class of the plurality of non-overlapping classes are transitioned to a state upon at least some of the multiple nodes of the first class accepting a proposal to change the state of said state machine according to the consensus protocol, the second class comprising nodes that are not current participants in the consensus protocol but which are reclassifiable into the first class; and
the multiple nodes in the first class are each configured to act on the proposal for a transition of the state machine in order to collectively accept or deny that proposal according to the consensus protocol.

2. The system as recited in claim 1 wherein the plurality of non-overlapping classes further comprise a third class that comprises nodes which are not permitted to participate in the consensus protocol.

3. The system as recited in claim 2 wherein the at least one node in the first class is configured to communicate accepted state transitions to one or more nodes in the third class.

4. The system as recited in claim 1, wherein the nodes in the first class are each assigned nodes in the second class and are configured to transmit an indication of an accepted state transition to their respective assigned nodes in the second class.

5. The system as recited in claim 1 wherein a second node of the plurality of nodes is classified as a master node having additional responsibilities according to the consensus protocol.

6. The system as recited in claim 5 wherein the additional responsibilities include periodically transmitting a communication to other ones of the plurality of nodes.

7. The system as recited in claim 6 wherein the communication includes data identifying a current state of the state machine on the master node wherein each of the plurality of nodes that maintain a respective replica of the state machine are configured to detect one or more missing state transitions responsive to the communication and are configured to request a state update responsive to detecting the one or more missing state transitions.

8. The system as recited in claim 1 wherein a second node of the plurality of nodes is configured to generate the proposal, and wherein the second node is configured to transmit the proposal only to nodes in the first class.

9. The system as recited in claim 1 wherein a second node of the plurality of nodes is configured to detect that a number of nodes in the first class is less than a desired number, and wherein the second node is configured to propose that one of the plurality of nodes in the second class be added to the first class responsive to the detecting.

10. The system as recited in claim 1 wherein at least one node in the first class is configured to communicate accepted state transitions resulting from the consensus protocol to nodes in other classes of the plurality of non-overlapping classes.

11. A non-transitory computer accessible storage medium storing a plurality of instructions which, when executed on a first node of a plurality of nodes:
maintain a first replica of a state machine on the first node, wherein one or more other nodes of the plurality of nodes also maintain replicas of the state machine, and wherein the plurality of nodes are classified into a plurality of non-overlapping classes including a first class that comprises multiple nodes that are each a current participant in a consensus protocol for controlling transitions of the state machine such that respective state machine replicas maintained by at least one node in the first class and one or more nodes in a second class of the plurality of non-overlapping classes are transitioned to a state upon at least some of the multiple nodes of the first class accepting a proposal to change the state of said state machine according to the consensus protocol, the second class comprising nodes that are not current participants in the consensus protocol but which are reclassifiable into the first class; and
responsive to the first node being in the first class, act on the proposal for a transition of the state machine in coordination with one or more other nodes of the first class in order to collectively accept or deny that proposal according to the consensus protocol.

12. The non-transitory computer accessible storage medium as recited in claim 11 wherein the plurality of non-overlapping classes further comprise a third class, wherein nodes in the third class are not permitted to become a participant in the consensus protocol.

13. The non-transitory computer accessible storage medium as recited in claim 12 wherein the plurality of instructions, when executed, transmit accepted state transitions to one or more nodes in the third class that are assigned to the first node.

14. The non-transitory computer accessible storage medium as recited in claim 12 wherein a second node of the plurality of nodes is classified as a master node having additional responsibilities according to the consensus protocol.

15. The non-transitory computer accessible storage medium as recited in claim 14 wherein the additional responsibilities include periodically transmitting a communication to other ones of the plurality of nodes.

16. The non-transitory computer accessible medium as recited in claim 15 wherein the communication includes data identifying a current state of the state machine on the master node, and wherein the plurality of instructions, when executed, detect one or more state missing transitions responsive to the communication and request a state update responsive to detecting the one or more state missing transitions.

17. The non-transitory computer accessible storage medium as recited in claim 11 wherein the plurality of instructions, when executed, generate the proposal and transmit the proposal only to nodes in the first class.

18. The non-transitory computer accessible storage medium as recited in claim 11 wherein the plurality of instructions, when executed, communicate accepted state transitions resulting from the consensus protocol to nodes in other classes of the plurality of non-overlapping classes.

19. The non-transitory computer accessible storage medium as recited in claim 11 wherein the plurality of instructions, when executed, detect that a number of nodes in the first class is less than a desired number; and propose that one of the plurality of nodes in the second class be added to the first class responsive to the detecting.

20. A non-transitory computer accessible storage medium storing a plurality of instructions which, when executed on a first node of a plurality of nodes:
maintain a first replica of a state machine on the first node, wherein one or more other nodes of the plurality of nodes also maintain replicas of the state machine, and wherein the plurality of nodes are classified into a plurality of non-overlapping classes including a first class that comprises multiple nodes that are each a current participant in a consensus protocol for controlling transitions of the state machine such that respective state machine replicas maintained by at least one node in the first class and one or more nodes in a second class of the plurality of non-overlapping classes are transitioned to a state upon at least some of the multiple nodes of the first class accepting a proposal to change the state of said state machine according to the consensus protocol, the second class comprising nodes that are not current participants in the consensus protocol but which are reclassifiable into the first class;
transmit the proposal for a transition of the state machine to cause the proposal to be evaluated according to the consensus protocol by the multiple nodes in the first class and not by nodes in the second class.

21. The non-transitory computer accessible storage medium as recited in claim 20 wherein the plurality of instructions, when executed responsive to the first node being in the first class, act on the proposal in coordination with one or more other nodes of the first class in order to collectively accept or deny that proposal according to the consensus protocol.

22. The non-transitory computer accessible storage medium as recited in claim 21 wherein the plurality of instructions, when executed on the first node in the first class, communicate accepted state transitions resulting from the consensus protocol to one or more nodes in the second class that are assigned to the first node.

23. The non-transitory computer accessible storage medium as recited in claim 20 wherein the plurality of non-overlapping classes further comprise a third class that comprises one or more nodes which are not permitted to participate in the consensus protocol.

24. The non-transitory computer accessible storage medium as recited in claim 23 wherein the plurality of instructions, when executed, do not transmit the proposal to one or more nodes in the third class.

25. The non-transitory computer accessible storage medium as recited in claim 20 wherein the plurality of instructions, when executed, communicate accepted state transitions resulting from the consensus protocol to nodes in other classes of the plurality of non-overlapping classes.

26. The non-transitory computer accessible storage medium as recited in claim 20 wherein the plurality of instructions, when executed, detect that a number of nodes in the first class is less than a desired number; and propose that one of the plurality of nodes in the second class be added to the first class responsive to the detecting.

27. A method, comprising:
for a plurality of nodes that comprises at least a subset of nodes that each maintain a respective replica of a state machine, classifying the plurality of nodes into a plurality of non-overlapping classes including a first class that comprises multiple nodes that are each a current participant in a consensus protocol for controlling transitions of a state machine such that respective state machine replicas maintained by at least one node in the first class and one or more nodes in a second class of the plurality of non-overlapping classes are transitioned to a state upon at least some of the multiple nodes of the first class accepting a proposal to change the state of said state machine according to the consensus protocol, the second class comprising nodes that are not current participants in the consensus protocol but which are reclassifiable into the first class; and
one of the plurality of nodes detecting that a number of nodes in the first class is less than a desired number; and
the one of the plurality of nodes generating the proposal to propose that a selected one of the plurality of nodes in the second class be added to the first class responsive to the detecting.

28. The method as recited in claim 27 further comprising, responsive to a first node being in the first class, the first node acting on the proposal for a transition of the state machine according to the consensus protocol.

29. The method as recited in claim 27 wherein the plurality of non-overlapping classes further comprise a third class, wherein nodes in the third class are not permitted to become a participant in the consensus protocol.

30. The method as recited in claim 27 further comprising classifying a second node of the plurality of nodes as a master node having additional responsibilities according to the consensus protocol.

31. The method as recited in claim 30 wherein the additional responsibilities include periodically transmitting a communication to other ones of the plurality of nodes.

32. The method as recited in claim 31 wherein the communication includes data identifying a current state of the state machine on the master node, and wherein the method further comprises detecting one or more missing transitions responsive to the communication and requesting a state update responsive to detecting the one or more missing transitions.

* * * * *